(12) United States Patent
Husain et al.

(10) Patent No.: US 11,494,828 B2
(45) Date of Patent: Nov. 8, 2022

(54) COMPONENTIZED ORDER ENTRY AND EDITING SYSTEM AND METHOD

(71) Applicant: SHOPIFY INC., Ottawa (CA)

(72) Inventors: Jahfer Husain, Ottawa (CA); Nicholas McDonald, Ottawa (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 16/843,972

(22) Filed: Apr. 9, 2020

(65) Prior Publication Data

US 2021/0319496 A1    Oct. 14, 2021

(51) Int. Cl.
*G06Q 30/00* (2012.01)
*G06Q 30/06* (2012.01)

(52) U.S. Cl.
CPC ..... *G06Q 30/0635* (2013.01); *G06Q 30/0603* (2013.01); *G06Q 30/0641* (2013.01)

(58) Field of Classification Search
CPC ........... G06Q 30/0635; G06Q 30/0603; G06Q 30/0641
See application file for complete search history.

(56) References Cited

U.S. PATENT DOCUMENTS

| | | | |
|---|---|---|---|
| 5,202,984 A * | 4/1993 | Kashio | G06F 16/178 |
| 7,379,906 B2 * | 5/2008 | Schellmann | G06Q 40/00 |
| | | | 705/30 |
| 8,117,086 B1 * | 2/2012 | Utz | G06Q 30/0635 |
| | | | 705/26.81 |
| 2002/0072986 A1 * | 6/2002 | Aram | G06Q 30/0635 |
| | | | 705/7.36 |
| 2002/0111877 A1 * | 8/2002 | Nelson | G06Q 10/06 |
| | | | 705/26.62 |
| 2005/0125251 A1 * | 6/2005 | Berger | G06Q 10/087 |
| | | | 719/310 |
| 2017/0046526 A1 * | 2/2017 | Chan | G06Q 10/1097 |
| 2019/0026685 A1 * | 1/2019 | Chappell | G06Q 30/0631 |
| 2019/0392061 A1 * | 12/2019 | Terry | G06F 9/466 |

OTHER PUBLICATIONS

Weigand, Hans, Ivars Blums, and Joost de Kruijff. "Shared Ledger Accounting—Implementing the Economic Exchange pattern." Information Systems 90 (2020): 101437.*

* cited by examiner

*Primary Examiner* — Kathleen Palavecino

(57) ABSTRACT

A componentized order entry and editing system and method is provided. The functionality of an order model is divided in components each of which execute their own rules independently. A data model is maintained in the form of a set of ledgers, and each ledger includes a complete history of additions and removals from the ledger associated with an order. The current state of the order is obtained by collapsing information in the ledgers. The rules of the components can be triggered in various ways, including user input, workflow, changes to one or more ledgers, and change to collapsed state.

22 Claims, 8 Drawing Sheets

FIG. 2

Agreements 700

| id | order_id | created_at |
|---|---|---|
| 1 | 1001 | T |
| 2 | 1001 | T+1 |

Product Lines 702

| id | order_id | product |
|---|---|---|
| 1 | 1001 | Foo |

Shipping Lines 704

| id | order_id | title | price |
|---|---|---|---|
| 1 | 1001 | Regular | $3 |
| 2 | 1001 | Express | $10 |

Sales 706

| id | order_id | product_line_id | shipping_line_id | agreement_id | kind | qty | price |
|---|---|---|---|---|---|---|---|
| 1 | 1001 | 1 |   | 1 | order | 2 | $10 |
| 2 | 1001 |   | 1 | 1 | order (shipping) | 1 | $3 |
| 3 | 1001 | 1 |   | 2 | return | 1 | $5 |
| 4 | 1001 |   | 1 | 2 | return (shipping) | 1 | $3 |
| 5 | 1001 |   | 2 | 2 | order (shipping) | 1 | $10 |

State 708

| id | order_id | product_line_id | shipping_line_id | kind | qty | price |
|---|---|---|---|---|---|---|
|   | 1001 | 1 |   | order | 1 | $5 |
|   | 1001 |   | 2 | order (shipping) | 1 | $10 |
| Total |   |   |   |   |   | $15 |

FIG. 5

COMPONENTIZED ORDER ENTRY AND EDITING SYSTEM AND METHOD

FIELD

The application relates to on-line stores generally, and to systems and methods for facilitating order entry and/or editing for an on-line store.

BACKGROUND

In an on-line store, for example, implemented as a service instance on an e-commerce platform, an order is typically represented in terms of a shopping cart object identifying goods being purchased, quantities of the goods, prices, discounts, taxes on the goods, customer information, and shipping details. An orders interface allows for these items to be entered, edited, deleted etc.

Existing approaches to order editing rely on the assumption that application programming interface (API) clients would be operating directly against an element of each order object.

As the number and complexities of various order editing scenarios continue to increase, it becomes untenable to expose all of these actions to all individual fields that make up an order on a unified order's interface or all historical updates/changes to the amalgamation of orders.

SUMMARY

A componentized order entry and editing system and method is provided. The functionality of an order model is divided in components each of which execute their own rules independently. A data model is maintained in the form of a set of ledgers, and each ledger includes a complete history of additions and removals from the ledger associated with an order. The current state of the order may be obtained by collapsing information in the ledgers. The rules of the components may be triggered in various ways, including user input, input from other services/external services, change to one or more ledgers, and change to collapsed state.

According to one aspect of the present invention, there is provided a computer implemented method for editing orders in an e-commerce platform using an order model, the method comprising, for each order: maintaining at least one ledger, said maintaining comprising for each of the at least one ledger adding an entry to the ledger for each addition event and adding an entry to the ledger for each removal event; said maintaining being performed by a plurality of components of the order model, each component configured to execute a respective set of rules that implement business logic of that component; wherein the addition of an entry to one of the at least one ledger by one of the components functions as a first trigger event for at least one other component to execute the respective set of rules of that component.

Optionally, the method further comprises: upon occurrence of another trigger event other than the addition of an entry to one of the at least one ledger by one of the components, causing at least one component to execute the respective set of rules of that component.

Optionally, each addition event is the result of executing rules of one of the components and each removal event is the result of executing rules of one of the components.

Optionally, the method further comprises: receiving at least one user input that functions as said another trigger event; or receiving at least one user input that causes an entry to be added to a ledger that in turn functions as said first trigger event; or receiving an automated input that functions as said first trigger event.

Optionally, the addition of an entry to one of the at least one ledger by one of the components functions as the first trigger event by: the addition of an entry to one of the at least one ledger functioning as the first trigger event; the addition of an entry to one of the at least one ledger causing a change in a collapsed state which in turn functions as the first trigger event.

Optionally, the another trigger functions as an initial event to trigger an operation, wherein each operation is realized through rules executed by one or more components as a result of the initial event, and rules executed by one or more components as a result of one or more entries being added to one or more ledgers.

Optionally, the plurality of operations comprise at least one of: a sale operation; a capture operation, an add to order operation, a remove from order operation, a return operation, a cancel operation, an exchange operation, a change shipping address operation, a fulfill operation, and an add discount operation.

Optionally, the components comprise at least one of: an inventory component a fulfillment component; a sales component; a payments component;

Optionally, the method further comprises: generating and displaying a current state of an order by collapsing information maintained in the ledgers.

Optionally, the ledgers comprise: at least one order line ledger, each order line ledger containing entries for one or multiple types of order line, and each order line having an order line identifier and an order identifier, wherein each order line identifies a respective order item; a sales ledger containing a respective entry for each addition or removal of an order item from an order, each entry comprising: i) a sale identifier; ii) an agreement identifier and an order identifier so as to associate the sale having the sale identifier with an agreement having the agreement identifier and with an order having the order identifier; iii) an order line identifier referring to an order line of one of the at least one order line ledger; iv) a quantity of the order item of the order line referenced by the order line identifier being added or removed; v) a price; an agreements ledger containing an entry for each agreement, the entry including an agreement identifier and an order identifier so as to associate an order having the agreement identifier with an order having the order identifier, wherein an agreement is used to associate together a group of entries in the sales ledger.

Optionally, there is a respective entry in one of the at least one order line ledgers for different types of order items as follows: a product line entry for each product that has been added and/or removed from the order; shipping line entry for each shipping option that has been added and/or removed from the order; tax line entry for each type of tax that has been added and/or removed from the order; tip line entry for each tip that has been add and/or removed from the order; a digital download line entry for each digital download that has been added and/or removed from the order; and a service line entry for each service that has been added and/or removed from the order.

According to another aspect of the present invention, there is provided an order editing system comprising: a processor and memory; a plurality of components of an order model each component configured to execute a respective set of rules that implement business logic of that component; a data storage containing at least one ledger; wherein the system is configured to execute a method for editing orders using the order model, the method comprising, for each order: maintaining at least one ledger, said maintaining comprising for each of the at least one ledger adding an entry to the ledger for each addition event and adding an entry to the ledger for each removal event; said maintaining being performed by the plurality of components of the order model; wherein the addition of an entry to one of the at least one ledger by one of the components functions as a first trigger event for at least one other component to execute the respective set of rules of that component.

Optionally, the system is further configured to: upon occurrence of another trigger event other than the addition of an entry to one of the at least one ledger by one of the components, cause at least one component to execute the respective set of rules of that component.

Optionally, each addition event is the result of executing rules of one of the components and each removal event is the result of executing rules of one of the components.

Optionally, the system is further configured to: receive at least one user input that functions directly as said another trigger event; or receive at least one user input that causes an entry to be added to a ledger that in turn functions as said first trigger event; or receive an automated input that functions as said first trigger event.

Optionally, the addition of an entry to one of the at least one ledger by one of the components functions as the first trigger event by: the addition of an entry to one of the at least on ledger directly functioning as the first trigger event; the addition of an entry to one of the at least one ledger causing a change in a collapsed state which in turn functions as the first trigger event.

Optionally, another trigger functions as an initial event to trigger an operation, wherein each operation is realized through rules executed by one or more components as a result of the initial event, and rules executed by one or more components as a result of one or more entries being added to one or more ledgers.

Optionally, the plurality of operations comprise at least one of: an initial sale operation; a capture operation, an add to order operation, a remove from order operation, a return operation, a cancel operation, an exchange operation, a change shipping address operation, a fulfill operation, and an add discount operation.

Optionally, the components comprise at least one of: an inventory component a fulfillment component; a sales component; a payments component;

Optionally, the system is further configured to: generate and display a current state of an order by collapsing information maintained in the ledgers.

Optionally, the ledgers comprise: at least one order line ledger, each order line ledger containing entries for one or multiple types of order line, and each order line having an order line identifier and an order identifier, wherein each order line identifies a respective order item; a sales ledger containing a respective entry for each addition or removal of an order item from an order, each entry comprising: i) a sale identifier; ii) an agreement identifier and an order identifier so as to associate the sale having the sale identifier with an agreement having the agreement identifier and with an order having the order identifier; iii) an order line identifier referring to an order line of one of the at least one order line ledger; iv) a quantity of the order item of the order line referenced by the order line identifier being added or removed; v) a price; an agreements ledger containing an entry for each agreement, the entry including an agreement identifier and an order identifier so as to associate an order having the agreement identifier with an order having the order identifier, wherein an agreement is used to associate together a group of entries in the sales ledger.

Optionally, there is a respective entry in one of the at least one order line ledgers for different types of order items as follows: a product line entry for each product that has been added and/or removed from the order; shipping line entry for each shipping option that has been added and/or removed from the order; tax line entry for each type of tax that has been added and/or removed from the order; tip line entry for each tip that has been add and/or removed from the order; a digital download line entry for each digital download that has been added and/or removed from the order; and a service line entry for each service that has been added and/or removed from the order.

BRIEF DESCRIPTION OF THE DRAWINGS

Embodiments of the disclosure will now be described with reference to the attached drawings in which:

FIG. 2 is an example of a home page of a merchant, according to one embodiment;

FIG. 5 is a specific example of the structure and contents of ledgers that may be used by the componentized order entry and editing system of FIG. 3;

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
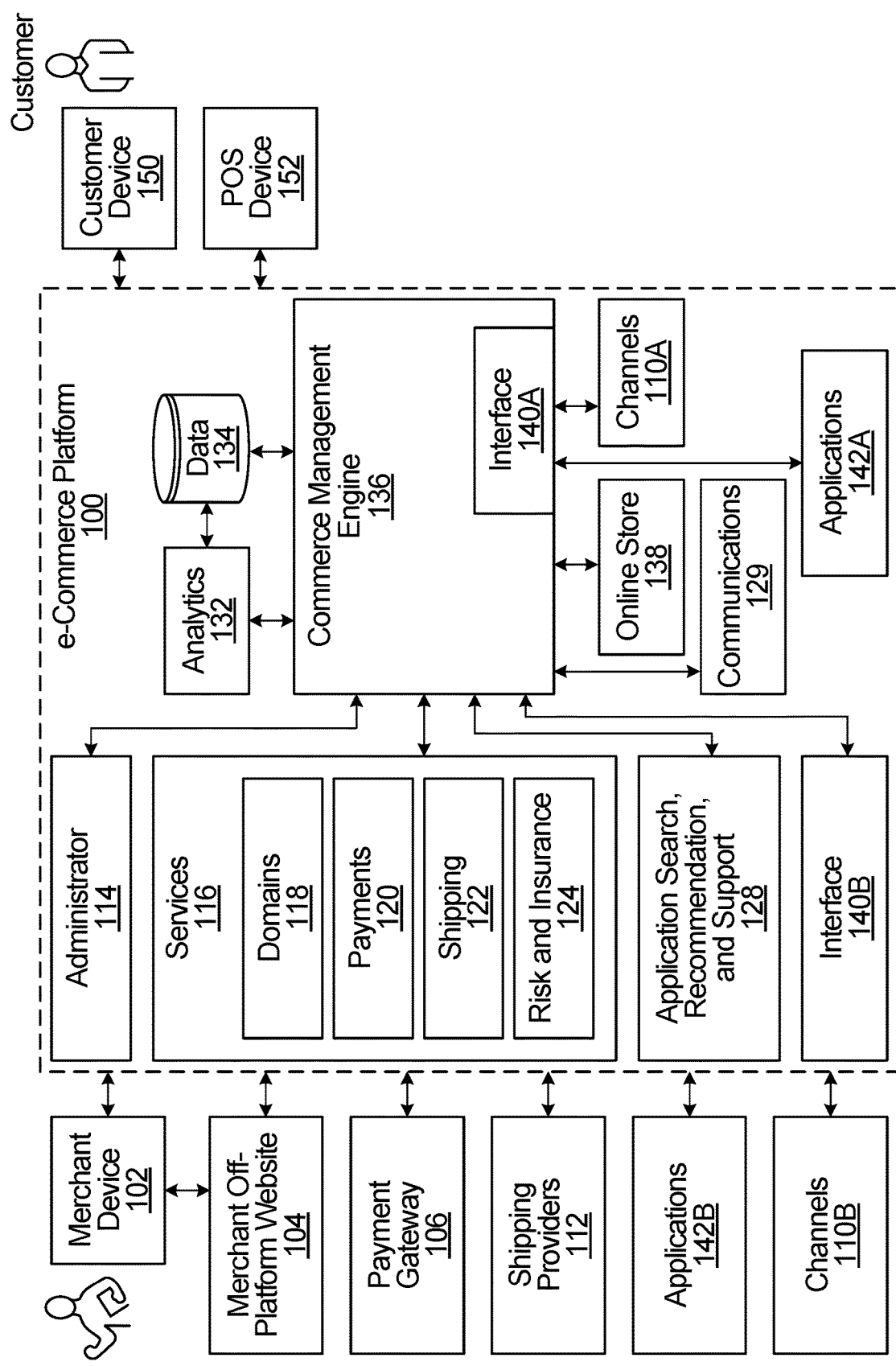
FIG. 1 is a block diagram of an e-commerce platform, according to one embodiment.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS device 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
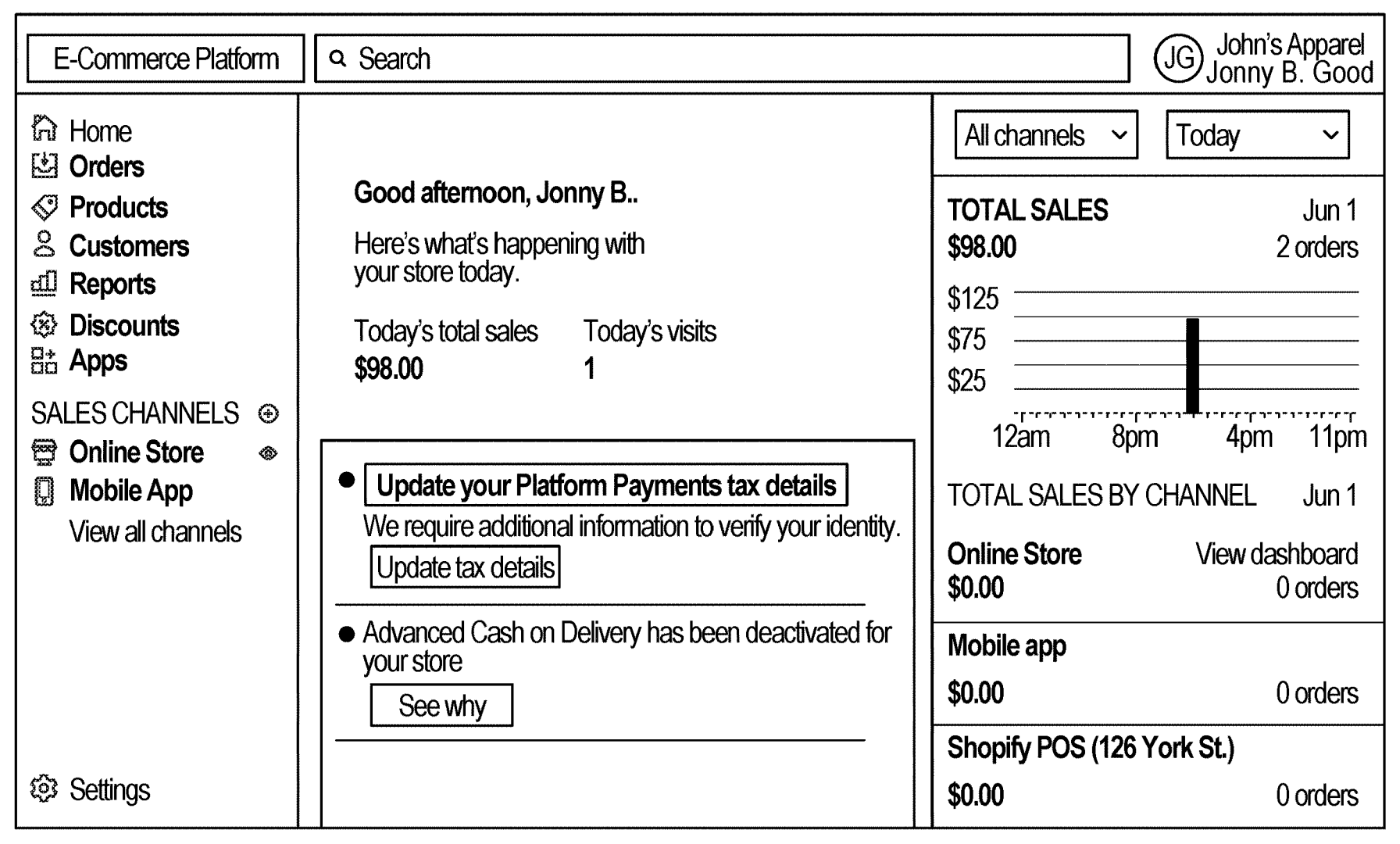

FIG. 2, which will be describe with further reference to FIG. 1, depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2B. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1 in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may make a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

The e-commerce platform 100 may be providing sales channels for multiple merchants, for their respective customers, and for varying types of merchandise. Payment gateways 106 are provided by the e-commerce platform or by external parties to process transactions in an e-commerce environment.

In addition to the above-noted e-commerce capabilities, the E-commerce platform of FIG. 1 can also be configured to facilitate the entry and/or editing or orders. As disclosed in further details below, the e-commence platform 100 also includes a new componentized order entry and editing system (COEES). Specifically the COEES described herein may be implemented within the commerce management engine 136 of the depicted e-commerce platform 100.

Although the COEES can be implemented as an element of the commerce management engine 136, this is only an example. A COEES could also or instead be provided by another component of the e-commerce platform 100 or offered as a stand-alone component or service that is external to the platform 100. In some embodiments, either or both of the applications 142A-B provide COEES in the form of a downloadable app that is available for installation on merchant on-line stores. The e-commerce platform 100 could include multiple COEES engines that are provided by one or more parties. The multiple COEES engines could be implemented in the same way, in similar ways and/or in distinct ways. In addition, at least a portion of a COEES engine could be implemented on the merchant device 102. For example, the merchant device 102 could store and run the COEES engine locally as a software application.

As discussed in further detail below, the COEES could implement at least some of the functionality described herein. Although the embodiments described below may be implemented in association with an e-commerce platform, such as (but not limited to) the e-commerce platform 100, the embodiments described below are not limited to the specific e-commerce platform 100 of FIGS. 1 and 2. Therefore, the embodiments below will be presented more generally in relation to any e-commerce platform. However, more generally, embodiments described herein do not necessarily need to be implemented in association with or involve an e-commerce platform.

In existing systems, a line item in an order object, more generally some data structure containing data fields, is the source of a significant amount of information. For example, it may have data fields that keep track of a variant snapshot, total price of line and quantity of purchase; it may have a separate concept to model returns (Refund Line item), and/or may track a behaviour or characteristic of each good (fulfillable, shippable, taxable).

In existing systems, line items are not flexible enough. If new concepts such as digital downloads, subscriptions or services are introduced, this would require the orders interface (and API clients) to understand how to work with these new objects.

APIs must do all their work against the order objects since it alone knows the aggregate state of the order. For example, when using an API designed to handle returns, each action against payments, inventory, and sales must be performed and recorded atomically, which is not an accurate model of how these events transpire as goods can be returned and restocked separately from processing refund transactions and the state of the order object may be become corrupted without internal validation across each individual field and the associated rules for each data field.

With existing systems, modelling order workflows requires deeply coupling to the data. To perform any workflow (e.g. refund, restock, cancellation), this requires interactions with an order's core artifacts (line items, refund line items, tax lines, shipping lines, etc.)

Existing systems may offer some limited order editing, for example the ability to add and remove items, and modify quantities. However, when there are discounts and taxes, these can be interconnected in complex ways. In existing systems, because all information is contained in the line item, with no history as to how the line item became what it is or how it was generated, internal inconsistencies may result. For example, if there is a discount consistent with the well-known "buy 2 get 1 free", removing an item from an order can affect the existence of a discount, requiring all aspects of the order object to be re-evaluated to maintain consistency. However, the recursive nature of ensuring consistency in conventional order objects may result in non-resolved states, and severely affect the performance of any system using such a system construct; to ensure that the system responds in an acceptable period of time, systems are built without resolving these inconsistencies.

In order to address some of the above issues, a new componentized order entry and editing system (COEES) and corresponding method are provided that remove and/or disassociate much of the business logic from the line items of an order object. In some embodiments, the business logic is moved to components of the order model, and the data is maintained in a data model specifically designed to be operated upon by the components of the order model. Then, the order per se is used to display current or collapse state information which is obtained from the data model.

An order is a contract of sale between a merchant and a buyer. In the provided componentized order entry and editing system, an order is uniquely identified by an order identifier. The COEES provides a collection of distinct business processes and data which are grouped together. These processes and data are associated with a given order through the order identifier.

Figure 3:
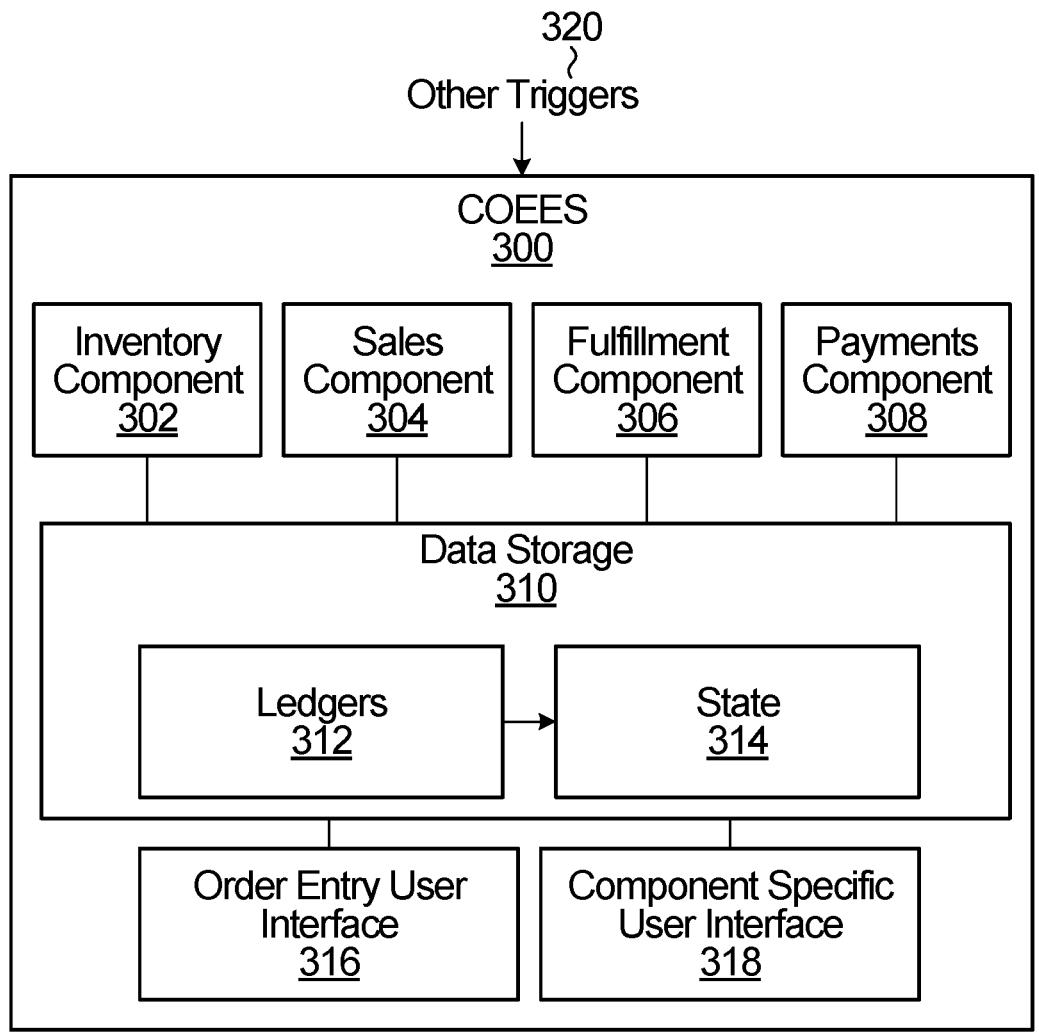
FIG. 3 is a block diagram of a componentized order entry and editing system provided by an embodiment.

A block diagram of an embodiment of a COEES 300 is depicted in FIG. 3. The COEES 300 includes an inventory component 302, a sales component 304, a fulfillment component 306, and a payments component 308. In addition, there is a data storage 310 containing ledgers 312 and state

314. Details of the ledgers and state information are provided below. In some embodiments, each component has at least one respective ledger. Alternatively, there is not a one to one relationship between components and ledgers. Each of the components 302, 304, 306, 308 (which can be implemented in software, as computer-readable instructions, for example) is configured to implement business logic (e.g. one or more rules) that operates on the data stored in data storage 310. In the example of FIG. 3, each of the components 302, 304, 306, 308 has a set of rules that implements the business logic of the component. Execution of one or more rules of a component can be triggered in various ways as detailed below.

Note also that in addition to having access to the ledgers 312 and state 314, the components also make use of data stored external to the COEES, for example data base 134 shown in FIG. 1. For example, the COEES may access inventory information that may be stored externally to the COEES, both in terms of reading the inventory, and having the inventory updated depending on activities of the COEES.

There is at least one user interface that may include one of, or both of, order entry user interface 316 and component-specific user interfaces 318. Some fields of the order entry user interface 316 may be populated from the ledgers produced and maintained using the individual components. Alternatively, all ledgers could be amalgamated into a single view and filtered to produce individual component ledgers that are used when editing/applying the rules of that component.

Execution of the rules of each component may result in the addition of an entry (e.g. a line) to one or more of the ledgers. The rules of one or more components may be executed each time an entry is added to one of the ledgers. In some embodiments, the rules are executed each time a transition entry is added, a transition entry being an entry that causes some change to be made to a current or collapsed state (e.g. of a component or element of a component) determined from the ledger content. The change in the current or collapsed state can be viewed as the event that caused execution of the rules, or simply the addition of the entry to the ledger can be viewed as the event that caused execution of the rules. Alternatively, or in addition, some or all of the rules are executed every time the order model is accessed. In some embodiments, a change in the current or collapsed state for a specific quantity functions as a trigger for one or more components specific to the quantity that changed, to execute their rules.

In some embodiments, all components execute their rules when an entry is added to one of the ledgers, but depending on the entry that has been added, the rules of some components may not require that component to do anything as a result of the entry. Alternatively, the entry of a line to a specific ledger triggers the execution of the rules of a subset of the components. However, as described above, if the subset of the components in turn adds entries to one or more ledgers, those entries could trigger the other components to execute their rules.

Once all the components have executed their rules based on all added entries, the system enters a stable state, and no further rules are executed until a further initial event occurs. Initial events are discussed below.

Also shown is an "other triggers" input 320 which is a catch all for any other input that may cause execution of the rules of one or more of the components.

For example, in addition to being triggered by the addition of an entry in one or more of the ledgers, initial events may occur, which can trigger one or more of the components to execute their rules. Examples of initial events include:

a. User input: for example a user adding an item to an already completed order may trigger the sales component to execute its rules; this might be received through the order entry user interface for example.

b. Automated inputs from elsewhere within the system, or external to the system; for example, a fraud service running in the background may be processing orders to identify possible fraud and trigger a cancel order event which may trigger the sales component to execute its rules.

c. Automated inputs from elsewhere in the system that directly add an entry to a ledger, which in turn functions as a trigger for one or more components to execute their rules.

It can be seen that the triggering mechanisms described above may result in a ripple effect, whereby an initial event/initial change to a ledger triggers execution of rules (e.g. in one or more components) that make subsequent changes to a ledger, which in turn may trigger execution of further rules (e.g in other components) that make further changes to a ledger and so on. This can continue until no further rules are triggered, in which case the system has reached a steady state. Once in steady state, no further rules are executed until another initial event occurs.

The set of components depicted in FIG. 3 is a specific example. Generally, depending on the business logic used, the order model may include any number of components. For example, rules implementing business logic to handle discounts, shipping, rewards, taxes and/or order attribution which, in the example of FIG. 3, are shown to be in the sales component 304 (further details below) could instead be implemented in separate components. More generally, an overall order entry and editing system as disclosed herein may be componentized in any number of ways. Other examples of components include:

Credits: Business models that involve buying inventory on credit may use a credits component to handle credit calculation and implementation at various stages of the business cycle;

Brokerage: Business models that involve buying and selling items on commission may use a brokerage component to keep track of brokers and handle their respective commissions;

Contracting: Business models that involve contracting equipment and/or services from external companies to complete an order may use a contracting component to handle payments for the contracted services;

Budget: Business models that involve completing orders within a fixed budget may use a budget component to handle budgeting at various stages of the business cycle.

In the example of FIG. 3, the inventory component 302 is a component for managing what goods and services a merchant is providing to the buyer. The sales component 304 is a component for managing the value of the goods and services being exchanged. The fulfillment component 306 is a component for managing how the merchant will source (and/or deliver) those goods and services to the buyer. The payments component 308 is a component for managing how the buyer will pay for the goods and services.

These components allow for the componentization of relationships around an order. The order identifier is a root-level identifier, and functions as the primary request key used across all components of an order.

Figure 4:
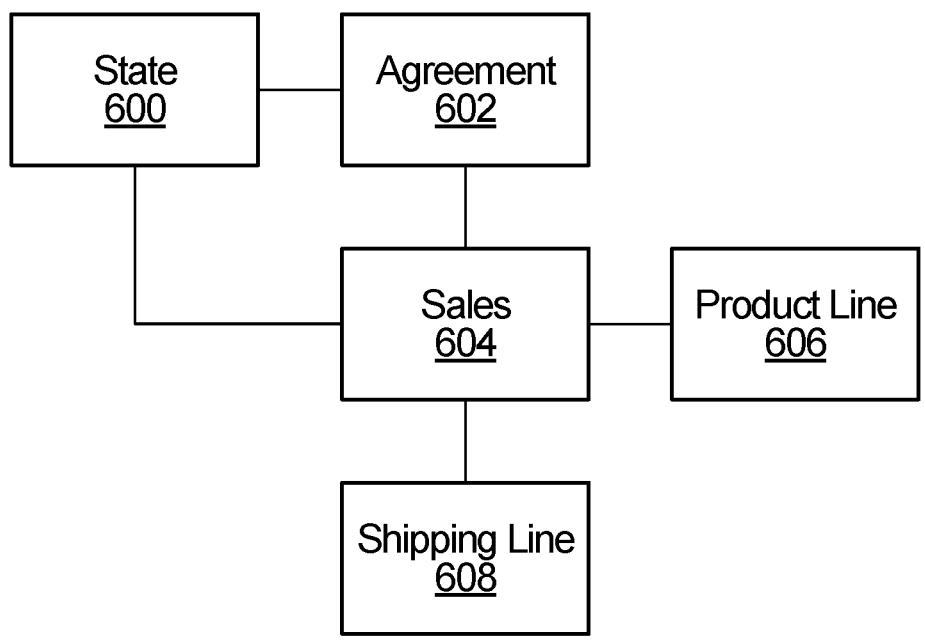
FIG. 4 depicts an example of a data structure for use within the system of FIG. 3.

FIG. 4 depicts an example data model for an order, that includes state 600, agreement 602, sale 604, product line 606, and shipping line 608. The ledgers 312 and state 314 of FIG. 3 are based on this data model. More generally, there is a respective ledger for each element of the data model other than state. All the data for an order is included in one of the ledgers represented in the data model. The data model for a given implementation may include different elements than those shown in the example of FIG. 4.

The state 600 contains state information for the order including an order identifier (order_id), aggregate fields and collapsed states of components determined from the content of the other ledgers. The state information could include one or more current or collapse states for the order itself, for a component of the order model and/or for an element of a component. The aggregate fields and states are updated as changes are made to the ledgers by the components. The state 600 does not have its own business logic, but rather this is delegated to components. This allows for an overarching grouping identifier for all components (fulfillment, inventory, sales, payment), without coupling to the data models of one another. In general, actions are not taken against an order, but against a given component.

A product line is an order line identifying a product, and a specific model/variant of the same product in a case where multiple versions exists. Note that product line 606 in FIG. 4 is a specific example of an order line. A shipping line 608 is another example.

The product line represents an immutable snapshot of the product/model/type of product at the time of sale. Any mutable information including quantity and price will not be included in the product line. That is to say, the product line does not include quantity and price information, but simply identifies the specific model. It is immutable in the sense that once a product line for a particular model is added to an order, it is never removed. The quantity of the particular model being ordered may change, and may even revert to zero, this quantity information being maintained elsewhere than in the product line per se. This allows the product line to merely be a data source for the sales component, not the only data source.

A line in the shipping lines ledger 608 contains data pertaining to a shipping option; there is a respective shipping line for each shipping option associated with the order. As described for a product line, a shipping line exists in the ledger 608 for any option that was ever associated with the order even though one or more of the shipping options may ultimately not be used as the order is edited.

Other possible order lines include:
Variant line: an order line identifying a different model of the same product in the cases where multiple versions exists); there would be a respective variant line for each such variant associated with the order;
Tax line: an order line containing tax; for example if different tax rates may be applied there would be a respective tax line for each tax rate associated with the order
Tip line: an order line containing tip information; there is a respective tip line for each tip option (e.g. different percentages) associated with the order;
Digital Download line: an order line identifying a digital download (analogous to product line, but for a digital download rather than a physical variant); there would be a respective digital download line for each digital download associated with the order;
Service line: an order line identifying a service (analogous to a product line, but for a service rather than a physical product); there would be a respective line for each service associated with the order.

A sale 604 specifies a quantity of an item (from any type of order line) being added to an order, or removed from an order, or the associated shipping, and the associated prices. Generally, for anything that will ultimately show up on a receipt, there will be a sale 604.

An order agreement 602 captures the bookings in the system. Bookings are funds that are expected to be received from customers (in the near future) based on accepted orders or contracts. Cancellations, amendments, and extensions can have a positive or negative impact on bookings. An order agreement 602 is composed of a group of sales 604 that were created in the same context. For example, sales 604 that are created during order creation may be grouped into a single agreement, and a new order agreement could be made, for example, for a return or cancellation of one or more of the agreement's associated sales. Agreements may be captured in the context of a given workflow, for example checkout and return. Agreements may be reconciled against tender through sales to make sure accounting books are balanced. For example, when an agreement for $45 is placed, this can be reconciled against capture of a $45 payment on PayPal. Every sale has an agreement, but an agreement can have multiple sales. Each agreement has its own agreement ID.

In the illustrated example, for each part of the data model except the state (e.g. agreement, sales, product line, shipping line) a respective ledger is maintained that includes a respective line that reflects each action relevant to that part of the data model. The ledger will include both lines for addition or removal events. In other words, lines for addition or positive activities (such as adding an item to a shopping cart) and lines for removal or negative activities (such as removing an item from a shopping cart). The lines in the ledger can be collapsed or flattened down to represent a current state, as discussed in further detail below. The current state of the overall order is a collection of state information from all relevant ledgers.

A complete history is maintained, since each ledger will include both the positive activities and negative activities. So unlike conventional systems, where if an item is added, and then removed, there is no history of this activity, with the provided approach, the ledgers will include a line item for adding, and another for removing. In some embodiments, the ledgers also include a timestamp for each line item as well as a number of other elements, which may vary depending on the implementation, as explained below in greater detail.

In some embodiments, a single ledger is used to contain all or at least two or more different types of order lines. In another embodiment, one or more types or combinations of order line types may have their own ledger. In the example of FIG. 5 detailed below, there is a separate ledger for product lines and shipping lines, but these could be combined in a single ledger.

Other examples of items that may have lines within their own ledgers, or lines within a larger order lines ledger include product, gift card, tip, shipping, reward cards, loyalty points, and tax.

In some embodiments, tax line items are included in the same ledger with other order lines, such as product lines, and reference other objects in the ledger. In another embodiment, tax line items are represented in their own ledger.

In some embodiments, discount lines are included in an order line ledger with other order lines, such as product lines, and reference other objects in the ledger. In another embodiment, discounts are represented in their own table.

For example, a respective discount line (either in a ledger that includes other order lines, or a dedicated discount ledger) might be included for each of several discounts available, in terms of percentage, absolute value, etc.

Order attribution: each sale may be associated to a sales channel (phone, retail, POS, web) and/or salesperson who made the sale. In some embodiments, order attribution information is included in the same ledger with other order lines, and references other objects in the ledger. In another embodiment, order attribution information is tracked in a separate ledger. This maintenance of order attribution information facilitates data segmentation based on channel, salesperson etc.

FIG. 5 shows a specific example of content of ledgers (312 of FIG. 3) associated with a single order having order identifier=order_id=1001 for each of the components. The ledger for agreements is indicated at 700, 702 for product lines, 704 for shipping lines, and 706 for sales. Each of the ledgers includes an order_id column for associating each line of the ledger with the order having an order identifier=order_id. The complete ledger for each component may include lines for multiple orders. By way of overview, the specific example of FIG. 5 pertains to an initial order of two items (product="Foo"), and the subsequent return of one of those two items.

The ledger 700 for agreements contains a respective line for each agreement associating the agreement with a specific order via the order identity. In the example of FIG. 5, the agreements ledger 700 reflects a first agreement having agreement ID "1" created at time T for order ID 1001, and has a second agreement having agreement ID "2" created at time T+1 for order ID 1001. The first agreement is the initial order of the two items, and the second agreement is the subsequent return of one of those two items.

The ledger 702 for product line contains a respective line for each product associating the product with a specific order via the order identity. In the example of FIG. 5, there is a single product line for the product "Foo".

The shipping lines ledger 704 contains a respective line for each shipping option. The shipping lines ledger contains the following items:
  Shipping line ID: an ID for the specific row in the shipping line ledger;
  Order ID: the ID of the order the shipping line applies to;
  Title: a title for the shipping event;
  Price: a price associated with the shipping options.

In the illustrated example, there are two shipping lines, the first of which pertains to regular shipping, at a cost of $3, and the second of which pertains to express shipping at a cost of $10.

The sales ledger 706 contains a respective line for each sale. Each sale is associated with an order via order identifier, with an agreement via agreement identifier, and may be associated with one or more order lines. In the illustrated example, each sale may be associated with a product line from product line 702 or a shipping line from shipping lines 704.

In the example of FIG. 5, there are two sales having respective sales IDs of 1 and 2 that are associated with agreement ID 1, and three sales having respective sales IDs 3, 4, and 5 associated with agreement ID 2. Each row in the sales ledger 706 contains the following items:
  Sales ID: an ID for the specific row in the sales ledger;
  Product ID: the product the sale pertains to, as listed in the product lines ledger 702;
  Shipping line ID: the line in the shipping lines ledger 704 that is applicable to the sale;
  Agreement ID: the agreement the sale is associated with;
  Kind: a kind or type associated with the sale. In the illustrated example, there are two kinds. A first kind, "order", is associated with adding an item or shipping charge to an order, and a second kind, "return", is associated with removing an item or shipping charge from the order. More specifically, kinds include:
    Order: line items for addition of an item to an order;
    Order (shipping): shipping associated with an order line item;
    Subscription: line item for multiple orders of an item over a given time period) or a single order for multiple items fulfilled in multiple fulfillments)
    Fulfillment: line item for fulfilling an order line item
    Return: line item for returning an item of an order;
    Return (shipping): shipping associated with a return line item;
  Quantity: this indicates a quantity associated with the sale;
  Price: this is a price associated with the sale.

In the example of FIG. 5, the first and second rows of the sales ledger 706 both pertain to order ID 1001, and agreement ID 1, namely the agreement for the initial order. The first line item of sales ledger 706 has line item ID=1, meaning that it pertains to the first product line in the line items ledger 702, which identifies the variant "Foo". The agreement ID is 1, and the kind is "order". The quantity is 2 and the price is $10. The second line item of sales ledger pertains to the shipping for the same agreement, and contains shipping line ID=1, referring to the first row in the shipping lines ledger 704 (one unit of regular shipping at a cost of 3$). The shipping price is imported into the sales ledger, but the source of the data is the shipping lines ledger.

The next three rows (third, fourth and fifth) all pertain to order ID 1001, and agreement ID 2, namely the agreement for the return. The third line item of sales ledger 706 has line item ID=1, meaning that it pertains to the first line item in the product lines ledger 702, which identifies the product "Foo". The agreement ID is 2, and the kind is "return". The quantity is 1, and the price is $5. The fourth line item of sales ledger pertains to the return shipping for the same agreement, and contains shipping line ID=1, referring to the first row in the shipping lines ledger 704. The quantity is 1, meaning one shipping charge, and the line concerns regular shipping at a cost of 3$. The shipping price is imported into the sales ledger 706, but the source of the price information is the shipping lines ledger 704. The fifth line item of sales ledger pertains to the order shipping for the same agreement, and contains shipping line ID=2, referring to the second row in the shipping lines ledger 704 (one unit of express shipping at a cost of 10$). The shipping price is imported into the sales ledger, but the source of the data is the shipping lines ledger.

In the example of FIG. 5, the state 708 contains state information for an order obtained by collapsing information from the sales ledger. In the illustrated example, after collapsing the information from the sales ledger, what remains is a first line pertaining to ordering quantity 1 of product line id 1(pertaining to "Foo") at a price of 5$, and a second line pertaining to shipping line id 2 (pertaining to express shipping) at a cost of 10$, and a total (15$) is included which is a total of the prices after collapsing. Optionally, the state 708 may include other data, such as the name of the product, the name of the shipping type etc. Alternatively, this can be stored in a separate cache component.

Using the described ledgers and state, it is possible to have dedicated and detailed models to accurately reflect the evolution of an order—whether the order includes standard product items, digital download, tip, environmental fee, service, or anything else—without sacrificing the ability to render a receipt via the state.

Figure 6:
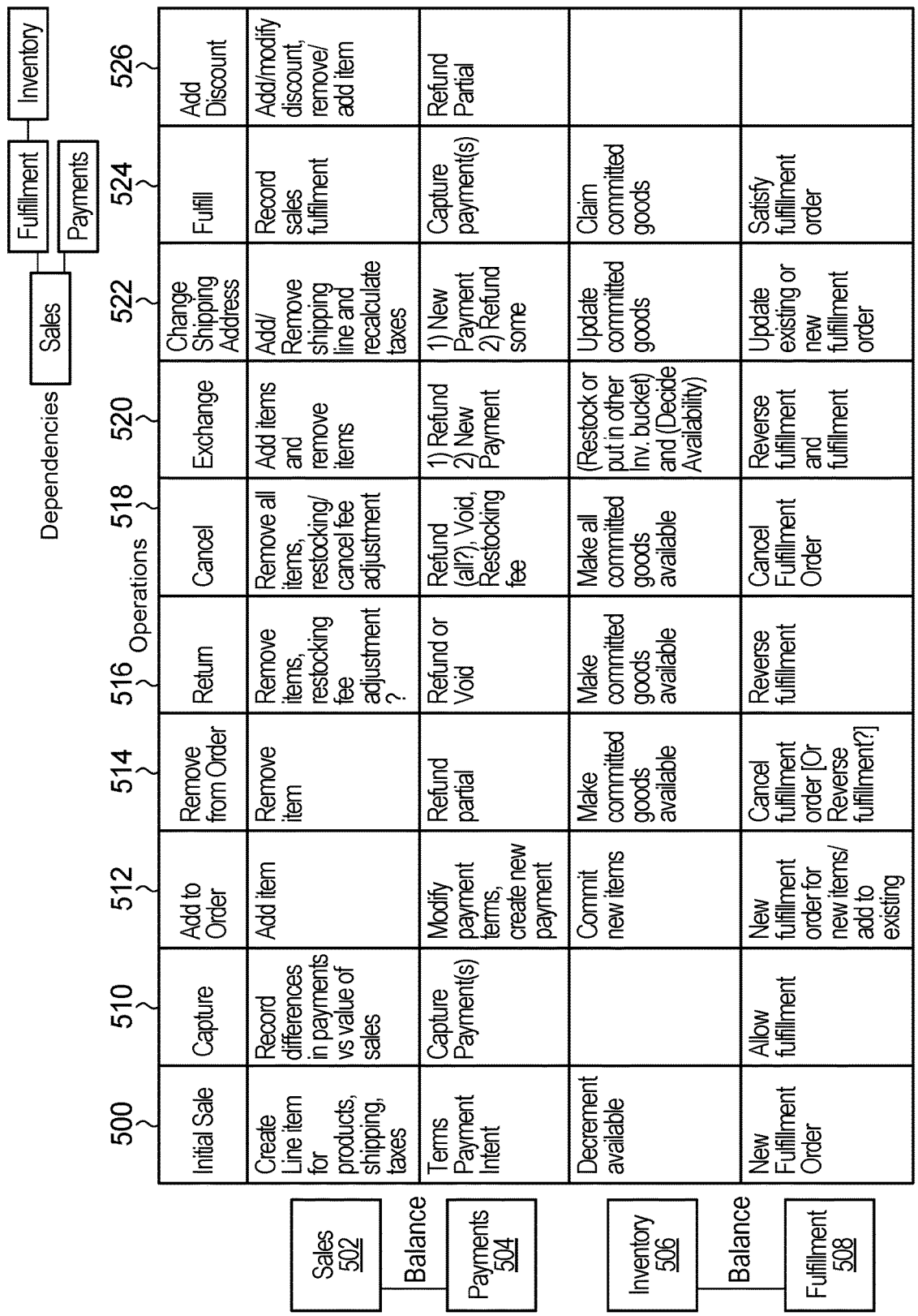
FIG. 6 is a detailed example showing how the functionality of the components of the componentized order entry and editing system associated with various operations.

FIG. 6 is an example of a set of operations, and how the operations may interact with sales, payments, inventory and fulfillment components. In a typical instance, one of these operations may be triggered by an initial event, such as a user input, or an automated input. This initial event triggers one or more of the components to execute its rules, which may cause the addition of an entry to one or more ledgers. These entries will in turn cause the rules of other components to execute. FIG. 6 shows examples of functionality that may be performed by the four components as a result of the initial event, and as a result of the ripple effect caused by the addition of entries to one or more ledgers.

Performing an initial sale operation 500 on an order causes rules in each of the individual components to implement the following business logic:
- Sales 502: creation of line items for products, shipping and taxes
- Payments 504: select and/or apply payment terms and intent
- Inventory 506: decrement available inventory for the selected items
- Fulfillments 508: creation of a new fulfillment order (e.g. for transmission to a fulfillment service or center)

In a specific example, the initial sale operation is initiated by a user (e.g. buyer or merchant), for example by clicking a "complete checkout" GUI element.

Performing a capture operation 510 on an order causes rules in each of the individual components to implement the following business logic:
- Sales 502: recording the difference (if any) in payment vs. value of sale from the contract of sale
- Payments 504: capturing payment(s) specified in the contract of sale
- Inventory 506: no action
- Fulfillments 508: allowing/authorizing transmission of the fulfillment order Performing an add to order operation 512 on an order causes rules in each of the individual components to implement the following business logic:
- Sales 502: adding selected items to the contract of sale
- Payments 504: modifying payment terms and creating a new payment for the selected items added
- Inventory 506: committing (e.g. reserving) the selected items from inventory to the contract of sale
- Fulfillments 508: creating a new fulfillment order for the selected items or adding the selected items to existing fulfillment order Performing a remove from order operation 514 on an order causes rules in each of the individual components to implement the following business logic:
- Sales 502: removing selected items from the contract of sale
- Payments 504: refunding the portion of the initial payment captured linked to the removed items
- Inventory 506: moving committed items back into inventory available for sale
- Fulfillments 508: cancelling the outstanding fulfillment order for the removed items and/or coordinating with the fulfillment service or center to reverse the fulfillment order Performing a return operation 516 on an order causes rules in each of the individual components to implement the following business logic:
- Sales 502: removing selected items from the contract of sale and/or adjusting for restocking fee
- Payments 504: refunding or voiding the portion of the initial payment captured for the removed items
- Inventory 506: moving committed items back into available for sale
- Fulfillments 508: reversing or cancelling the outstanding fulfillment order for the removed items and/or coordinating with the fulfillment service or center to reverse the fulfillment order In some embodiments, in association with a return, refund order lines (another example of an order line) are created as well as new sales lines. In addition, a new agreement is produced that holds references to the newly-created sales associated with the return. The refund order lines and new sales lines would provide detailed pricing information for the returned goods, including discounts and associated taxes. The new agreement and its related sales are now part of the new source of truth for determining the current state of the order and which items have been returned.

Performing a cancel operation 518 on an order causes rules in each of the individual components to implement the following business logic:
- Sales 502: removing all the items from the contract of sale, and/or adjusting for restocking/cancellation fees
- Payments 504: refunding or voiding the initial payment captured
- Inventory 506: moving the committed items back into inventory available for sale
- Fulfillments 508: reversing or cancelling the outstanding fulfillment order and/or coordinating with the fulfillment service or center to reverse the fulfillment order Performing an exchange operation 520 on an order causes rules in each of the individual components to implement the following business logic:
- Sales 502: replacing selected items from the contract of sale with selected new items
- Payments 504: refunding or voiding the portion of the initial payment captured for the removed items and/or capturing a new payment for the selected new items
- Inventory 506: restocking removed items (e.g. incrementing the available inventory) or assigning the items returned to an "other inventory" bucket and decrementing available inventory for selected new items
- Fulfillments 508: reversing or cancelling the outstanding fulfillment order for the removed items, and creating a new fulfillment order for the selected new items or adding the selected new items to an existing fulfillment order In some embodiments, an exchange is defined as an agreement with both positive and negative associated sales meaning that the associated sales contain both items added in and items taken out. This would allow the exchange to maintain the same order id as the originating order contract for easy tracking, but would still allow each agreement to be attributed properly e.g. associated with a different staff, salesperson or sales channel.

Performing a change shipping address operation 522 on an order causes rules in each of the individual components to implement the following business logic:
- Sales 502: adding and/or removing line items for shipping and/or taxes, recalculating a value for contract of sale and/or recording the difference (if any) in payment previously captured vs. updated value for the contract of sale Payments 504: capturing new payment if shipping costs/taxes are higher or a refund if shipping costs/taxes are lower Inventory 506: If a new merchant location (or fulfillment center) with inventory is closer to the new shipping address, update the available inventory for previous location (e.g. increment) and for new location (e.g. decrement)

Fulfillments 508: update the existing fulfillment order or create a new fulfillment order (e.g. ship from new sourcing locating instead of previous location)

Performing a fulfill operation 524 on an order causes rules in each of the individual components to implement the following business logic:

Sales 502: recording of the sales fulfillment (e.g. adding a fulfillment product sale or sales fulfillment line item)

Payments 504: capturing payment(s) specified in the corresponding contract of sale Inventory 506: claim the committed items from available inventory Fulfillments 508: allowing/authorizing transmission of the fulfillment order created Performing an add discount operation 526 on an order causes rules in each of the individual components to implement the following business logic:

Sales 502: adding and/or modifying discount line or adding/removing selected discount item to the contract of sale Payments 504: refunding the portion of the initial payment captured linked to the discounted items Inventory 506: no action Fulfillments 508: no action A detailed example of an initial event, and the following rule execution by the components will now be described for an add to order operation.

An initial event to trigger the operation may be a user input requesting an item be added to an already completed, but not yet fulfilled, order. This may occur through the above described order entry user interface, for example. This functions as a trigger for the sales component to add a line to the sales ledger that increments the quantity of the item by plus 1. If the item is not in the sales ledger, then a line is added to the product lines ledger first. Alternatively, instead of the sales component adding the line to the sales ledger, a service may add this line directly upon receipt of the user input. Alternatively, one or more components may be listening for an add to order operation to occur.

In this example, the other components, including inventory, fulfillment, payments are not triggered in the initial user input that triggered the add to order operation, but they may be triggered by the addition of a line to the sales ledger. This "triggering" may be direct in the sense that one or more components are informed of the addition of the line to the sales ledger. Alternatively, it can be passive in the sense that the one or more components are constantly/periodically monitoring the ledgers that they are interested in (e.g. ledgers that contain line items that indicate a change to parameters or inputs to the rules executed by the components), and when a new line is detected in those ledger(s), they execute their rules. Once the line is added to the sales ledger, the sales component also updates the price information (value of the contract of sale) in the sales ledger.

The payments component detects the new line (or is notified of the new line) in the sales ledger. Payments calculates a total payment difference that applies as a result of the new line. Note that this can be an increase representing payment due or a decrease representing a refund due (for example in the case of a multiple item purchase discount). The payments component then executes rules that attempt to capture the payment with existing payments credentials. Confirmation of a successful payment is written to a payments ledger in a new entry (not shown in FIG. 5 example). The amount written in the new entry is the difference capture or delta; the collapsed state of the payments ledger will represent the total received for the order.

In this example, the addition of a line to the sales ledger also triggers execution of the inventory component. The inventory component adjusts inventory for the product that has been added to the ledger. In some cases, the inventory component may maintain its own ledger, or alternatively, this may be achieved by communicating with another source of inventory information, such as an external inventory database. In some cases, the inventory component and the payments component may execute their rules in parallel once the line has been added by the sales component.

More generally, for any given trigger, one or more components may execute in parallel. Alternatively, the components may operate in accordance with a predefined sequence for a given trigger.

The fulfillment component is monitoring (or notified of) changes in the payments ledger and the inventory ledger. When the payments ledger has indicated payment is complete, and the inventory has been adjusted, the fulfillment component is triggered to execute a set of rules implementing business logic to fulfill an order, for example, by transmitting a request to a fulfillment service such as a warehouse management system for packing and sending the item to a customer, or adding to an order still in process of an existing fulfillment request. The fulfillment component may then update a fulfillment state in its own fulfillment ledger (not shown).

At this point, for this example, there is no other functionality that needs to be performed by any of the components, and steady state has been reached. No further rules need be executed until another initial event occurs.

Figure 7A:
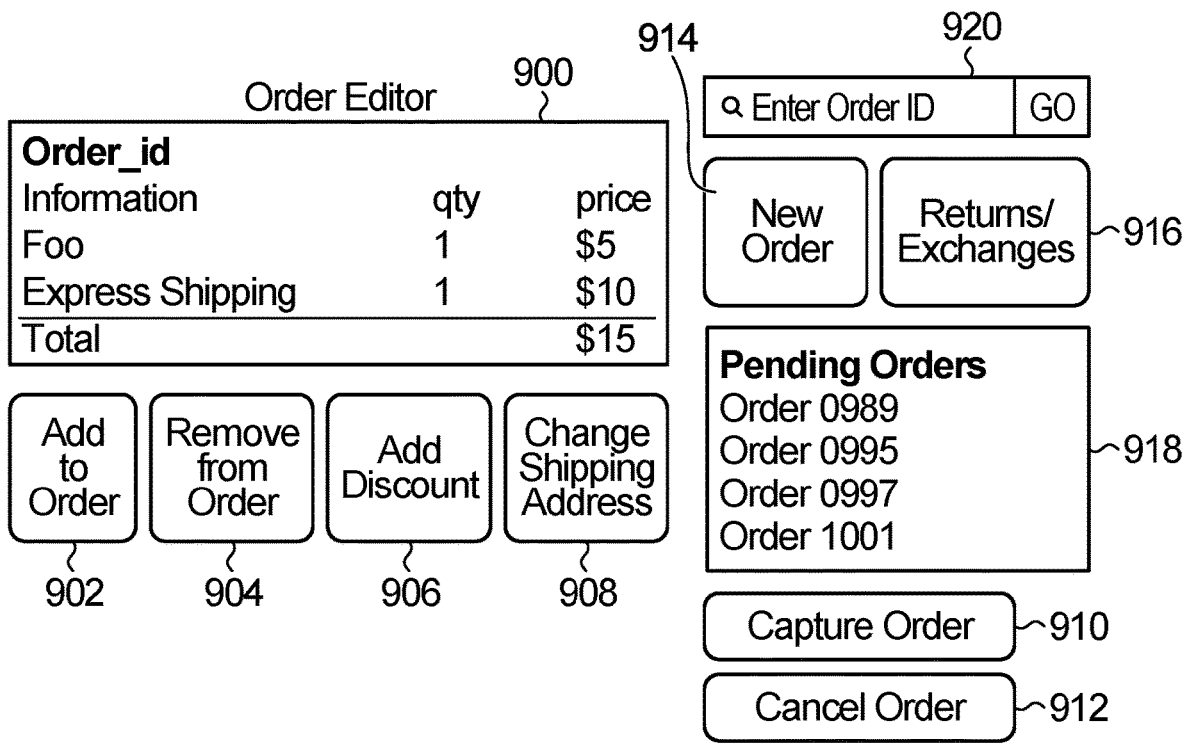
FIG. 7A depicts an example of a GUI forming part of the componentized order entry and editing system to achieve some of the operations described with reference to FIG. 6.

FIG. 7A shows a specific example of a GUI that may be implemented as part of the COEES. The GUI may be used by a user to trigger the execution of the rules of one or more components, as detailed above. Note that more generally, there may be operations implemented within the system that are not necessarily each triggered by a GUI action as described above. For example, some operations may be triggered by other events that occur within the system. The GUI shows an order editor where a selected order is displayed as the current order 900 that is to be edited. The information displayed for the specific current order corresponds to the information provided in the example of FIG. 5. Pending orders can be selected from the pending order list 918 or searched by entering the order ID in the order search bar 920. A new order can be initiated using the "New Order" option 914, which triggers the initial sale operation 500. Similarly, returns and/or exchanges for existing orders can be initiated using the Returns/Exchanges option 916, which triggers the return operation 516 and/or exchange operation 520. Orders can also be cancelled using the Cancel Order option 912, which triggers the cancel operation 518.

The current order information can be edited in the order editor GUI using the following options:

Add to Order 902: This option allows the user to add items to the current order list by triggering add to order operation 512;

Remove from Order 904: This option allows the user to remove items from the current order list by triggering remove from order operation 514;

Add Discount 906: This option allows the user to add a discount to the current order list by triggering add discount operation 526;

Change Shipping Address 908: This option allows the user to change the shipping address of the current order list by triggering the change shipping address operation 522.

Figure 7B:
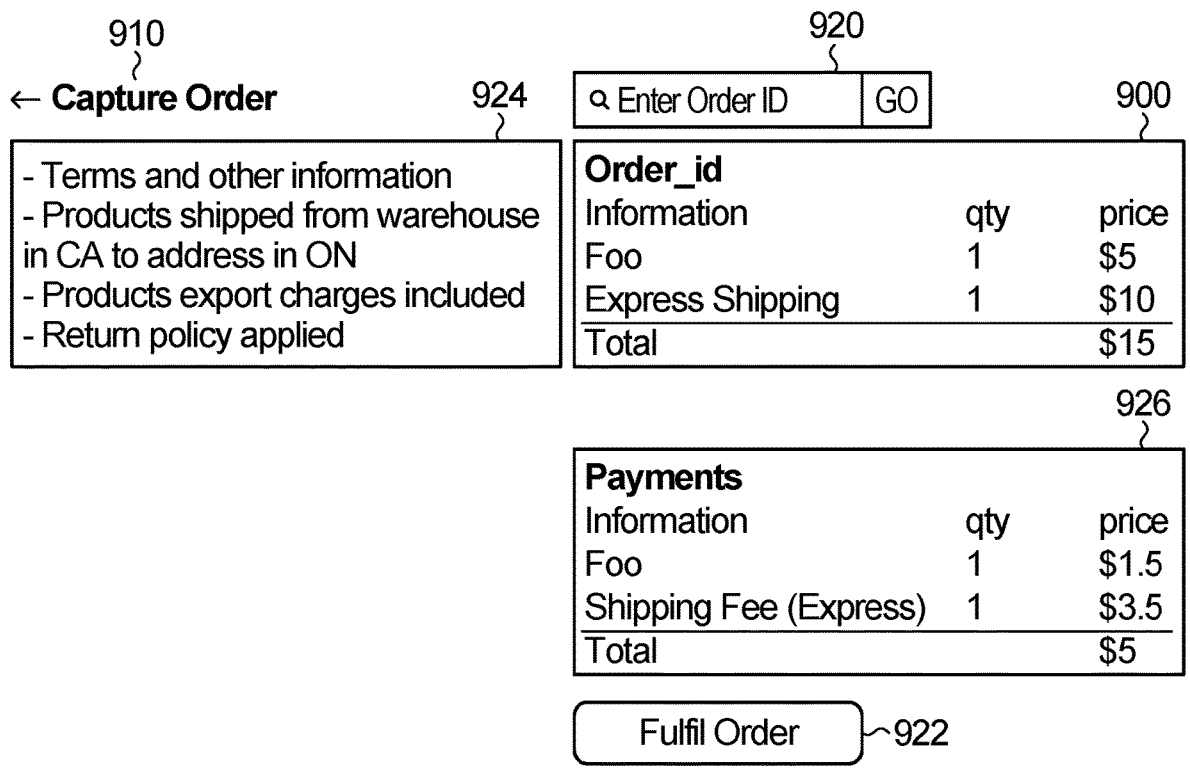
FIG. 7B depicts another example of a GUI forming part of the componentized order entry and editing system specific to order fulfillment.

The Capture Order option 910 triggers the capture operation 510, which causes another GUI as depicted in FIG. 7B to be displayed. The GUI displays the current order information 900 and the terms and other information 924 associated with the current order. Additional information regarding the payments for each variant in the order list is also displayed under payments 926. The order can then be fulfilled by the Fulfill Order option 922 which triggers the fulfill operation 524. Alternatively, fulfillment is automatically triggered once the order is fully captured.

Rules

As described above, each component implements a respective set of rules. The rules of at least one component are in various circumstances described in detail above. Depending on the nature of the specific circumstance, the rules from different components may be executed. In some embodiments, there may be amount thresholds that effect which rules are executed. For example, certain COEES might be configured to have different rules around the dollar value of an order with set thresholds; if an order edit affects the amount of the order, this may change which set of rules apply. For a given component, running the rules may result in the addition of further new line items to one or more of the ledgers and an added line item may represent an addition event or a removal event.

Numerous modifications and variations of the present disclosure are possible in light of the above teachings. It is therefore to be understood that within the scope of the appended claims, the disclosure may be practiced otherwise than as specifically described herein.

The invention claimed is:

1. A computer implemented method for editing orders in an e-commerce platform using an order model, the method comprising, for each order:
receiving user input for editing the order, the order comprising an identification of one or more items selected for purchase via the e-commerce platform and associated quantities and prices, the input comprising addition events and/or and removal events, an addition event causing addition of an item to the order and a removal event comprising removal of an item from the order;
maintaining at least one ledger, said maintaining comprising for each of the at least one ledger adding an entry to the ledger for each addition event associated with the order and adding an entry to the ledger for each removal event associated with the order;
said maintaining being performed by a plurality of components of the order model, each component configured to execute a respective set of rules that implement business logic of that component;
said maintaining comprising:
one of the components adding an entry to one of the at least one ledger, the adding of the entry functioning as a trigger event; and
as a result of the trigger event, at least one other component executing the respective set of rules of that component.

2. The method of claim 1 further comprising:
upon occurrence of another trigger event other than the addition of an entry to one of the at least one ledger by one of the components, causing at least one component to execute the respective set of rules of that component.

3. The method of claim 1 wherein each addition event is the result of executing rules of one of the components and each removal event is the result of executing rules of one of the components.

4. The method of claim 1 further comprising:
receiving at least one user input that functions as said another trigger event; or
receiving at least one user input that causes an entry to be added to a ledger that in turn functions as said first trigger event; or
receiving an automated input that functions as said first trigger event.

5. The method of claim 1 wherein the addition of an entry to one of the at least one ledger by one of the components functions as the first trigger event by:
the addition of an entry to one of the at least one ledger functioning as the first trigger event;
the addition of an entry to one of the at least one ledger causing a change in a collapsed state which in turn functions as the first trigger event.

6. The method of claim 1 wherein the another trigger functions as an initial event to trigger an operation, wherein each operation is realized through rules executed by one or more components as a result of the initial event, and rules executed by one or more components as a result of one or more entries being added to one or more ledgers.

7. The method of claim 6 wherein the plurality of operations comprise at least one of:
a sale operation; a capture operation, an add to order operation, a remove from order operation, a return operation, a cancel operation, an exchange operation, a change shipping address operation, a fulfill operation, and an add discount operation.

8. The method of claim 1 wherein the components comprise at least one of:
an inventory component
a fulfillment component;
a sales component;
a payments component.

9. The method of claim 1 further comprising:
generating and displaying a current state of an order by collapsing information maintained in the ledgers.

10. The method of claim 1 wherein the ledgers comprise:
at least one order line ledger, each order line ledger containing entries for one or multiple types of order line, and each order line having an order line identifier and an order identifier, wherein each order line identifies a respective order item;
a sales ledger containing a respective entry for each addition or removal of an order item from an order, each entry comprising:
i) a sale identifier;
ii) an agreement identifier and an order identifier so as to associate the sale having the sale identifier with an agreement having the agreement identifier and with an order having the order identifier;
iii) an order line identifier referring to an order line of one of the at least one order line ledger;

iv) a quantity of the order item of the order line referenced by the order line identifier being added or removed;
v) a price;
an agreements ledger containing an entry for each agreement, the entry including an agreement identifier and an order identifier so as to associate an order having the agreement identifier with an order having the order identifier, wherein an agreement is used to associate together a group of entries in the sales ledger.

11. The method of claim 10 wherein there is a respective entry in one of the at least one order line ledgers for different types of order items as follows:
a product line entry for each product that has been added and/or removed from the order;
shipping line entry for each shipping option that has been added and/or removed from the order;
tax line entry for each type of tax that has been added and/or removed from the order;
tip line entry for each tip that has been add and/or removed from the order;
a digital download line entry for each digital download that has been added and/or removed from the order; and
a service line entry for each service that has been added and/or removed from the order.

12. An order editing system comprising:
a processor and memory;
a plurality of components of an order model each component configured to execute a respective set of rules that implement business logic of that component;
a data storage containing at least one ledger;
wherein the system is configured to execute a method for editing orders using the order model, each order comprising an identification of one or more items selected for purchase via the e-commerce platform and associated quantities and prices, the method comprising, for each order:
receiving user input for editing the order, the input comprising addition events and/or and removal events, an addition event causing addition of an item to the order and a removal event causing removal of an item from the order;
maintaining at least one ledger, said maintaining comprising for each of the at least one ledger adding an entry to the ledger for each addition event associated with the order and adding an entry to the ledger for each removal event associated with the order;
said maintaining being performed by the plurality of components of the order model;
said maintaining comprising:
one of the components adding an entry to one of the at least one ledger, the adding of the entry functioning as a trigger event; and
as a result of the trigger event, at least one other component executing the respective set of rules of that component.

13. The system of claim 12 further configured to:
upon occurrence of another trigger event other than the addition of an entry to one of the at least one ledger by one of the components, cause at least one component to execute the respective set of rules of that component.

14. The system of claim 12 wherein each addition event is the result of executing rules of one of the components and each removal event is the result of executing rules of one of the components.

15. The system of claim 12 further configured to:
receive at least one user input that functions directly as said another trigger event; or receive at least one user input that causes an entry to be added to a ledger that in turn functions as said first trigger event; or
receive an automated input that functions as said first trigger event.

16. The system of claim 12 wherein the addition of an entry to one of the at least one ledger by one of the components functions as the first trigger event by:
the addition of an entry to one of the at least on ledger directly functioning as the first trigger event;
the addition of an entry to one of the at least one ledger causing a change in a collapsed state which in turn functions as the first trigger event.

17. The system of claim 12 wherein the another trigger functions as an initial event to trigger an operation, wherein each operation is realized through rules executed by one or more components as a result of the initial event, and rules executed by one or more components as a result of one or more entries being added to one or more ledgers.

18. The system of claim 17 wherein the plurality of operations comprise at least one of:
an initial sale operation; a capture operation, an add to order operation, a remove from order operation, a return operation, a cancel operation, an exchange operation, a change shipping address operation, a fulfill operation, and an add discount operation.

19. The system of claim 12 wherein the components comprise at least one of:
an inventory component
a fulfillment component;
a sales component;
a payments component.

20. The system of claim 12 further configured to:
generate and display a current state of an order by collapsing information maintained in the ledgers.

21. The system of claim 12 wherein the ledgers comprise:
at least one order line ledger, each order line ledger containing entries for one or multiple types of order line, and each order line having an order line identifier and an order identifier, wherein each order line identifies a respective order item;
a sales ledger containing a respective entry for each addition or removal of an order item from an order, each entry comprising:
i) a sale identifier;
ii) an agreement identifier and an order identifier so as to associate the sale having the sale identifier with an agreement having the agreement identifier and with an order having the order identifier;
iii) an order line identifier referring to an order line of one of the at least one order line ledger;
iv) a quantity of the order item of the order line referenced by the order line identifier being added or removed;
v) a price;
an agreements ledger containing an entry for each agreement, the entry including an agreement identifier and an order identifier so as to associate an order having the agreement identifier with an order having the order identifier, wherein an agreement is used to associate together a group of entries in the sales ledger.

22. The system of claim 21 wherein there is a respective entry in one of the at least one order line ledgers for different types of order items as follows:
a product line entry for each product that has been added and/or removed from the order;
shipping line entry for each shipping option that has been added and/or removed from the order;

tax line entry for each type of tax that has been added and/or removed from the order;

tip line entry for each tip that has been add and/or removed from the order;

a digital download line entry for each digital download that has been added and/or removed from the order; and a service line entry for each service that has been added and/or removed from the order.

\* \* \* \* \*